United States Patent [19]

Slaugh et al.

[11] 4,433,981
[45] Feb. 28, 1984

[54] $CO_2$ REMOVAL FROM GASEOUS STREAMS

[75] Inventors: Lynn H. Slaugh; Carl L. Willis, both of Houston, Tex.

[73] Assignee: Shell Oil Company, Houston, Tex.

[21] Appl. No.: 277,513

[22] Filed: Jun. 26, 1981

Related U.S. Application Data

[63] Continuation-in-part of Ser. No. 235,409, Feb. 18, 1981, abandoned, which is a continuation-in-part of Ser. No. 86,012, Oct. 17, 1979, abandoned.

[51] Int. Cl.³ .............................................. B01D 53/04
[52] U.S. Cl. .......................................... 55/59; 55/68; 55/74
[58] Field of Search ..................... 55/59, 62, 68, 74; 252/411 R, 462, 463, 475, 476; 423/230

[56] References Cited

U.S. PATENT DOCUMENTS

| 1,982,223 | 11/1934 | Metzger et al. | 55/68 X |
|---|---|---|---|
| 2,320,118 | 5/1943 | Blaker | 252/463 X |
| 2,354,892 | 8/1944 | Thacker | 252/463 X |
| 2,454,227 | 11/1948 | Smith et al. | 252/463 X |
| 3,070,639 | 12/1962 | Geerts et al. | 252/463 X |
| 3,141,729 | 7/1964 | Clarke et al. | 252/463 X |
| 3,204,009 | 8/1965 | Keith | 252/463 X |
| 3,232,028 | 2/1966 | McDonald et al. | 55/68 |
| 3,619,130 | 11/1971 | Ventriglio et al. | 55/68 X |
| 3,751,878 | 8/1973 | Collins | 55/68 X |
| 3,865,924 | 2/1975 | Gidaspow et al | 55/68 X |
| 3,885,927 | 5/1975 | Sherman et al. | 55/68 |
| 4,171,329 | 10/1979 | Koniz et al. | 252/463 X |
| 4,206,148 | 6/1980 | Biola et al. | 252/463 X |

Primary Examiner—Robert H. Spitzer

[57] ABSTRACT

Carbon dioxide is removed from a gaseous stream by contacting the stream with an adsorbent prepared by impregnating a porous aluminum with an alkali metal or alkaline earth metal oxide or salt decomposable upon calcination and subsequently calcining the impregnated alumina at about 350° C.–700° C.

8 Claims, No Drawings

CO₂ REMOVAL FROM GASEOUS STREAMS

This application is a continuation-in-part of application Ser. No. 235,409 filed Feb. 18, 1981, which is a continuation of application Ser. No. 086,012, filed Oct. 17, 1979, both now abandoned.

FIELD OF THE INVENTION

This invention relates to a process for removing carbon dioxide from a gaseous stream.

BACKGROUND OF THE INVENTION

The removal of carbon dioxide from various gases is important in many areas. For example, many hydrocarbon process streams contain carbon dioxide impurities which can contaminate downstream processes such as propylene polymerization. Other areas of interest involve closed ecological systems such as submarines, diving apparati and the like where it is imperative that the carbon dioxide exhaled by the occupants be removed from the remaining air.

One method that has been used to remove carbon dioxide from gaseous streams involves the use of liquids, such as solutions containing ethanolamine, ammonia, soda, carbonates and lyes. However, such systems are expensive and are not simple to regenerate. These systems are also subject to physical loss by carryover and entrainment in the gaseous phase. The solutions tend to be corrosive to conventional processing equipment and carryover only exacerbates this problem.

Another approach to the problem has been to use solid absorbent materials such as so-called molecular sieves, calcium oxide, finely divided micro-porous silver oxide dispersed and in admixture with aluminum oxide, and supported cogels of divalent and trivalent metals such as that disclosed in U.S. Pat. No. 3,141,729, issued July 21, 1964. However, these special substances are ordinarily quite expensive. In addition, the molecular sieves, for example, have low capacity for carbon dioxide and also co-absorb other gases which either contaminate the carbon dioxide upon its removal or require pre-processing of the gas stream passing through the adsorbent.

Another approach has been to use alkali metal carbonates coated on carriers or admixed with alumina to absorb carbon dioxide. U.S. Pat. No. 3,865,924 issued Feb. 11, 1975, disclosed the use of a synergistic mixture of carbonate and alumina. Since the sorption reaction is as follows:

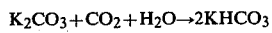

$$K_2CO_3 + CO_2 + H_2O \rightarrow 2KHCO_3$$

it can be seen that water must be supplied before the process is effective. This addition of water is detrimental to many process streams.

SUMMARY OF THE INVENTION

This invention provides a method for removing carbon dioxide from gaseous streams. It is particularly effective for removing trace amounts of carbon dioxide. The method comprises contacting the gaseous stream with an adsorbent prepared by impregnating a porous aluminum oxide support with an alkali metal or alkaline earth metal oxide or salt decomposable upon calcination and calcining the resultant material at a temperature ranging from about 350° C.–850° C., preferably 350° C.–700° C. After use the adsorbent materials can be readily regenerated by heating to calcining conditions. The adsorbent is a solid, stable, relatively non-toxic, inexpensive material that can be regenerated continuously using only heat or hot gases without deterioration with time. It can readily be used in packed beds and provides little or no dusting or carryover of fines. The adsorbent is much easier to prepare and less expensive than the cogels of the prior art. Preferred adsorbents are $K_2O$-$Al_2O_3$ and $Na_2O$-$Al_2O_3$.

DESCRIPTION OF THE PREFERRED EMBODIMENTS

Carbon dioxide is effectively removed from gas streams using the compositions of the present invention. These compositions are particularly effective for removing carbon dioxide impurities from hydrocarbon streams and shift gas streams. They are extremely effective in removing trace amounts, say up to several percent by volume. Higher concentrations require more frequent regeneration. Since, however, the compositions of this invention can readily be regenerated, this presents no particular problem.

The alumina adsorbents of this invention are prepared, for example, by impregnating or providing an alumina with alkali metal or alkaline earth metal compounds decomposable to the oxide during calcination or by forming a composition of alumina and an alkali metal oxide or an alkaline earth metal oxide, and then calcining the resultant composition. It is thought that the alkali metal and alkaline earth metal salts during calcination react after intermediate oxide formation with the alumina to form a metal aluminate. Suitable impregnating alkali or alkaline earth metal compounds that decompose during calcination to include, for example, carbonates, bicarbonates, hydroxides, cyanides, cyanates, chelates, alkoxylates and salts of other weak acids or salts of strong acids that decompose upon calcination such as the nitrates. Calcination temperatures range from about 350° C. to about 850° C., preferably from about 350° C. to about 700° C. The calcination is carried out in any atmosphere: vacuum, reducing, neutral or oxidizing. When the decomposable salt has an organic anionic moiety such as carboxylate, alkoxylate, chelate, etc., it is preferred to carry out the calcining in a neutral atmosphere such as nitrogen or argon, or an oxidizing atmosphere such as air or oxygen. Air is preferred. When a reducing atmosphere is utilized in this case, there is the possibility that the organic moiety will decompose to a carbonaceous material which will coat the adsorbent, reducing its effectiveness. Oxygen, in many cases, can contaminate feed stocks, so that when an oxygen-containing gas is used for calcining, it is frequently advantageous to do the latter stages of calcination in neutral or reducing atmospheres in order to sweep out any oxygen from the adsorbent. Calcining times are not critical and depend on calcining temperature, higher temperatures requiring shorter times. Typical times range from about 0.1 to about 50 hours. The time-temperature combination selected should be such that the alkali metal or alkaline earth metal oxide or salts reacts almost completely with the alumina.

The adsorbents are regenerated by reheating to calcining conditions, i.e., to about 350° C.–850° C., preferably 350° C.–700° C. in any atmosphere, reducing, neutral or oxidizing. When carbonaceous materials such as tar or coke are present on the adsorbent, the regeneration is preferably carried out in an oxygen-containing atmosphere, such as air, while preferably controlling the amount of oxygen to prevent temperatures in substantial excess of about 700° C. Excess temperatures cause sintering and loss of surface area. As in calcining, it may be desirable to purge material regenerated in an oxygen-containing atmosphere with a neutral or reducing gas.

The alkali metals used to form the catalyst of this invention are potassium, sodium, lithium, rubidium and cesium, while the alkaline earth metals include magnesium, calcium, strontium and barium. Combinations of alkali metals and/or alkaline earth metals can be used. Preferred impregnating materials for the alumina are sodium and potassium carbonates and bicarbonates. For diolefin-containing streams sodium carbonate and bicarbonate are preferred. Salts of strong acids that do not completely decompose for instance, sulfates and halides are not satisfactory since the adsorbent capacity is determined by the amount of metal aluminate formed upon calcination.

The alumina employed can be any of the variety of available aluminas or alumina hydrates, such as alumina gel, activated alumina, gamma alumina, etc. Regarding purity of the alumina, it may be stated that small amounts of impurities are not generally detrimental. The most suitable aluminas for use in the present invention are found to be those having a high surface area, for instance, alumina having a surface area of at least about 100 $M^2/g$. The alumina may contain minor amounts of other compounds such as silica. Aluminas are readily available commercially which are readily usable in the instant invention. The following table lists several commercial aluminas and their properties which are found suitable.

| Alumina | Surface Area, $m^2$g | Pore Vol., Co/gm | Na, ppm | $SO_4^=$, % wt | $Fe_2O_3$, % wt | $Cl^-$, % wt |
|---|---|---|---|---|---|---|
| CCI[a] | 252 | 0.8 | 160 | 0.06 | — | 0.02 |
| KA-201[b] | 365 | 0.42 | 600 | 0.03 | — | 0.01 |
| RA-1[c] | 263 | 0.26 | 4700 | 0.02 | 0.18 | — |
| ACCO[d] | 225 | 0.68 | 580 | 0.6 | — | 0.6 |
| Norton | 218 | 0.62 | 0.51 | 0.03 | — | 0.03 |
| CATAPAL[e] | 348 | 0.91 | | | | |
| FILTROL[f] | 214 | 0.82 | | | | |

[a]Catalysts & Chemicals, Inc., now United Catalysts
[b]Kaiser
[c]Reynolds Corp.
[d]American Cyanamid Corp.
[e]Conoco Corp.
[f]Filtrol Corp.

Known methods for adding the component(s) to the alumina can be employed. A preferred method is to soak the alumina pellets or particles in an aqueous solution of the desired water-soluble alkali or alkaline earth metal compound and then convert the impregnating compound to the corresponding alkali or alkaline earth metal aluminate by drying and calcining at temperatures from about 350° C.–700° C. Dry impregnation can be suitably used. Since the impregnating compound is primarily reacting with the surface of the alumina, both external and internal pore surface, then the maximum amount of impregnating compound that can be effectively utilized will depend on the surface area. Of course, lesser amounts can be used. Ordinarily, the molar ratio of alkali metal to alumina will range from about 2:1 to about 1:50, preferably from about 1:1 to about 1:25 and the ratio of alkaline earth metal to alumina will range from about 1:1 to about 1:100 preferably from about 1:2 to about 1:50.

The adsorbent is effective up to temperatures of about 300° C. There is no particular lower limit on the temperature. When hydrocarbon streams are being processed, this lower limit is determined by the particular hydrocarbon stream being processed and the temperature at which it solidifies or becomes too viscous to process.

The adsorbent is used in typical fashion. It is preferably used in a packed bed or column. The use of dual columns allow one to be regenerated while the other is adsorbing.

The process of this invention is illustrated by the following examples which are provided for illustration and comparative purposes and are not to be construed as limiting the invention.

EXAMPLE 1

The following example typifies the production of adsorbents used in the invention.

7 Grams of C.P. grade sodium carbonate were dissolved in 26 mls of deionized water. This solution was poured on 40 gms of Kaiser grade KA-201 alumina (20–30 mesh) while the latter was being stirred. The volume of solution and the weight of alumina was proportioned essentially to fill the pores in the alumina without excess solution. The impregnated material was dried at 100° C. in air. The composition was then calcined in air for 16 hours at 575° C. Analysis indicated that the composition contained about 7 percent by weight of sodium measured as the metal.

Similar adsorbents are prepared, for example by using solutions of sodium nitrate, sodium acetate, potassium carbonate, potassium nitrate, potassium bicarbonate, cesium nitrate, calcium nitrate, strontium nitrate and barium formate.

EXAMPLE 2

The following example illustrates the use of an alkali metal oxide in alumina for adsorbing carbon dioxide from a vapor stream.

A catalyst was prepared according to the teachings of Example 1 by impregnating Kaiser KA-201 alumina (20–30 mesh) with a solution of potassium nitrate and calcining in air at 575° C. for 16 hours. A reactor having dimensions of about 20 cm in length by 1 sq. cm. in cross sectional area was filled with 20 ml of the adsorbent composition. A stream of propylene containing 230 ppm of carbon dioxide was fed into the top of the reactor at various rates and at different temperatures. The effluent from the reactor was monitored by GLC for carbon dioxide breakthrough. Breakthrough is defined as the point when the carbon dioxide concentration in the effluent rose from essentially zero to a detectable level of about 5 ppm. The results are shown in Table 1.

TABLE I

| Cumulative Liters Fed | Reactor Temp., °C. | Rate (GHSV) | Breakthrough |
|---|---|---|---|
| 5 | 100 | 1666 | No |
| 20 | 200 | 1500 | No |
| 27 | 250 | 1200 | No |
| 34 | 300 | 1200 | No |
| 42 | 400 | 1200 | Yes - total |

Similar results are found with $K_2O/Al_2O_3$, $Li_2O/Al_2O_3$, $Rb_2O/Al_2O_3$ and $Cs_2O/Al_2O_3$ adsorbents.

EXAMPLE 3

The following example illustrates the use of an alkaline earth metal oxide on alumina for adsorbing carbon dioxide from a vapor stream.

A catalyst was prepared according to the teachings of Example 1 by impregnating Kaiser KA-201 alumina (20-30) mesh with a solution of calcium nitrate and calcining in air at 575° C. for 2 hours. The reactor of Example 2 was filled with 20 ml of the adsorbent composition. A stream of propylene containing 100 ppm of carbon dioxide was fed into the top of the reactor which was operated at room temperature. The results are shown in Table II.

TABLE II

| Cumulative Liters Fed | Rate (GHSV) | Breakthrough |
|---|---|---|
| 10 | 3333 | No |
| 20 | 2608 | No |
| 30 | 2857 | No |
| 40 | 2500 | No |
| 47 | 3000 | No |
| 55 | 3000 | No |
| 63 | 3000 | No |
| 68 | 1500 | Yes - 85% removal |
| 74 | 1500 | Yes - 75% removal |

Similar results are found with $MgO/Al_2O_3$, $BaO/Al_2O_3$ and $SrO/Al_2O_3$.

EXAMPLE 4

A potassium oxide on alumina adsorbent was utilized seven times and regenerated each time after use by heating to 575° C. for 16 hours in air. There was no loss in adsorption capacity after seven use-regeneration cycles. The other alkali metal oxide and alkaline earth metal oxides on alumina give similar results.

We claim:

1. A process for removing carbon dioxide from a gaseous stream which comprises contacting said stream at a temperature up to about 300° C. with an adsorbent prepared by impregnating a porous alumina with a sodium or potassium oxide or salt decomposable to the oxide and calcining the impregnated alumina at a temperature ranging from about 350° C. to about 850° C.

2. The process of claim 1 where, in the adsorbent, the molar ratio of sodium or potassium metal to alumina ranges from about 2:1 to about 1:50.

3. The process of claim 2 where, in the adsorbent, the sodium or potassium salt is a carbonate or bicarbonate.

4. The process of claim 1 where, in the adsorbent, the impregnated alumina is calcined at about 350° C. to about 700° C.

5. The process of claim 4 where, in the adsorbent, the molar ratio of sodium or potassium metal to alumina ranges from about 2:1 to about 1:50.

6. The process of claim 5 where, in the adsorbent, the sodium or potassium salt is a carbonate or bicarbonate.

7. The process of claims 1, 2, 3, 4, 5 or 6 wherein after contacting the carbon dioxide-containing gaseous stream with the adsorbent for a substantial period of time, the flow of said stream is stopped, the adsorbent is reheated to calcining temperature until substantially all of the carbon dioxide is stripped off, the adsorbent is cooled to operation conditions and the flow of the gaseous stream is resumed.

8. The process of claims 1, 2, 3, 4, 5 or 6 wherein after contacting the carbon dioxide-containing gaseous stream with the adsorbent for a substantial period of time, the flow of said stream is stopped, a stream of non-carbon dioxide-containing gas is passed over the adsorbent at calcining temperature until substantially all of the carbon dioxide is stripped off, the flow of non-carbon dioxide-containing gas is stopped and the flow of carbon dioxide-containing gas is resumed.

* * * * *